United States Patent [19]
McLaughlin

[11] 4,201,893
[45] May 6, 1980

[54] PRIVATE AUTOMATIC BRANCH EXCHANGE TELEPHONE SYSTEM WITH TWO DATA SOURCES SHARING A MULTIPLEXED DATA BUS

[75] Inventor: Donald W. McLaughlin, Naperville, Ill.

[73] Assignee: GTE Automatic Electric Laboratories Incorporated, Northlake, Ill.

[21] Appl. No.: 946,699

[22] Filed: Sep. 28, 1978

[51] Int. Cl.$^2$ .......................................... H04Q 11/04
[52] U.S. Cl. .................................................. 370/58
[58] Field of Search ........ 179/15 AT, 15 AQ, 15 AL

[56] References Cited

U.S. PATENT DOCUMENTS

| | | | |
|---|---|---|---|
| 3,347,992 | 10/1967 | Von Sanden et al. | 179/15 AT |
| 3,761,633 | 9/1973 | Schlichte | 179/15 AT |
| 3,804,989 | 4/1974 | Carbrey | 179/15 AT |
| 4,007,338 | 2/1977 | McLaughlin | 179/15 AT |

*Primary Examiner*—Douglas W. Olms
*Attorney, Agent, or Firm*—Robert J. Black; Charles A. Doktycz

[57] ABSTRACT

Groups of analog trunks are shown connected to analog to digital converters. The converters are each assigned a time during which their associated trunks may access a common data bus to the pulse code time division switching system. Provision is made for the use of T1 carrier channels to utilize the times normally assigned for the analog trunks by the provision of a circuit that one excludes the other from accessing the bus.

5 Claims, 2 Drawing Figures

PRIVATE AUTOMATIC BRANCH EXCHANGE TELEPHONE SYSTEM WITH TWO DATA SOURCES SHARING A MULTIPLEXED DATA BUS

BACKGROUND OF THE INVENTION

1. Field of the Invention

This invention relates to pulse code modulation telephone switching systems generally and more particularly, to an arrangement for flexibly intermixing digital and analog trunks.

2. Description of the Prior Art

Private automatic branch telephone exchanges function as centralized switching systems providing connection between a number of locally connected telephone lines with associated telephone apparatus and one or more trunk circuits connecting the private automatic branch exchange to a distant central office.

Until very recent times private automatic branch exchanges (PABX's) have provided switching between lines and trunks on a space divided basis. That is, switches of either an electro-mechanical or electronic configuration have provided selective paths through the switching system to interconnect lines to each other or to trunk circuits serving the PABX. In such systems the signals transmitted through the PABX were generally of an analog nature. Where a line or a trunk circuit employing digital techniques such as pulse code modulation was employed, interface circuitry providing analog to digital conversion and digital to analog conversion were a necessity.

More recently a new generation of PABX systems employing time division switching have been provided. Some such systems as the "Dimension" PABX manufactured by Western Electric Company have provided time division switching of analog signals. Other more recent developments in PABX systems have provided time division switching of pulse code modulated signals. Systems of this type have been manufactured by GTE Automatic Electric Company and designated GTD 120, GTD 1000 and GTD 4600. In such systems as the GTD series, analog to digital, digital to analog interfaces have been provided between the lines and trunks and the time division switching system.

To effect greater economies in transmission equipment more extensive use has been made in recent years of digital transmission equipment. Of particular wide acceptance has been the so called T1 type carrier systems which employ pulse code modulation to provide a number of multiplexed signal paths over a single transmission facility such arrangements are currently in use primarily between telephone central offices. To date little utilization of such economies has taken place in transmission facilities between central offices and private automatic branch exchanges. The state of the art and time division switching systems employing pulse code modulated signals as the transmission format is exemplified by such systems as the aforementioned GTD 120 the operation of which is described in U.S. Pat. No. 4,007,338 issued to D. W. McLaughlin. The use of two one way lines for signalling in the D2 or D3 PCM type format is discussed in the article "Second Generation Toll Quality PCM Carrier Terminal" by L. Dean Crawford in the April, 1972 issue of the Automatic Electric Technical Journal. A channel bank unit of the type employed and as described above is manufactured by GTE Lenkurt Incorporated and designated the 9002A channel bank.

Accordingly, it is the primary object of this invention to provide facilities in a private branch exchange for trunk circuits connected via a T1 span line and employing pulse code modulation without the introduction of channel bank equipment and to be able to use the fixed trunk numbering format of the PABX.

SUMMARY OF THE INVENTION

The present invention comprises the sharing of a multiplexed PCM data bus in the GTD-120 EPABX network. The dual sources of PCM data are the normal analog to digital convertors (ATD) which accept pulse amplitude modulated (PAM) samples from analog signal sources such as analog trunks and code the PAM samples to PCM and the digital trunk interface which outputs PCM from the T1 carrier span to the network PCM bus via the T1 Buffer's (T1B) outgoing buffer. The exclusion operation is controlled by a digital trunk interface which is the T1B. Individual time slot PCM samples to the common PCM bus to the network are controlled by the T1B's selective gating operation. This selection process involves detecting a trunk identity from the network channel enable bus and then determining if it is an analog or digital trunk time slot. This determination either disables the ATD convertor from presenting its data and enables the T1B buffer or vise versa.

BRIEF DESCRIPTION OF THE DRAWINGS

The invention will now be described in more detail by way of example only, with reference to the accompanying drawings, wherein.

DESCRIPTION OF THE PREFERRED EMBODIMENT

General

Figure 1:
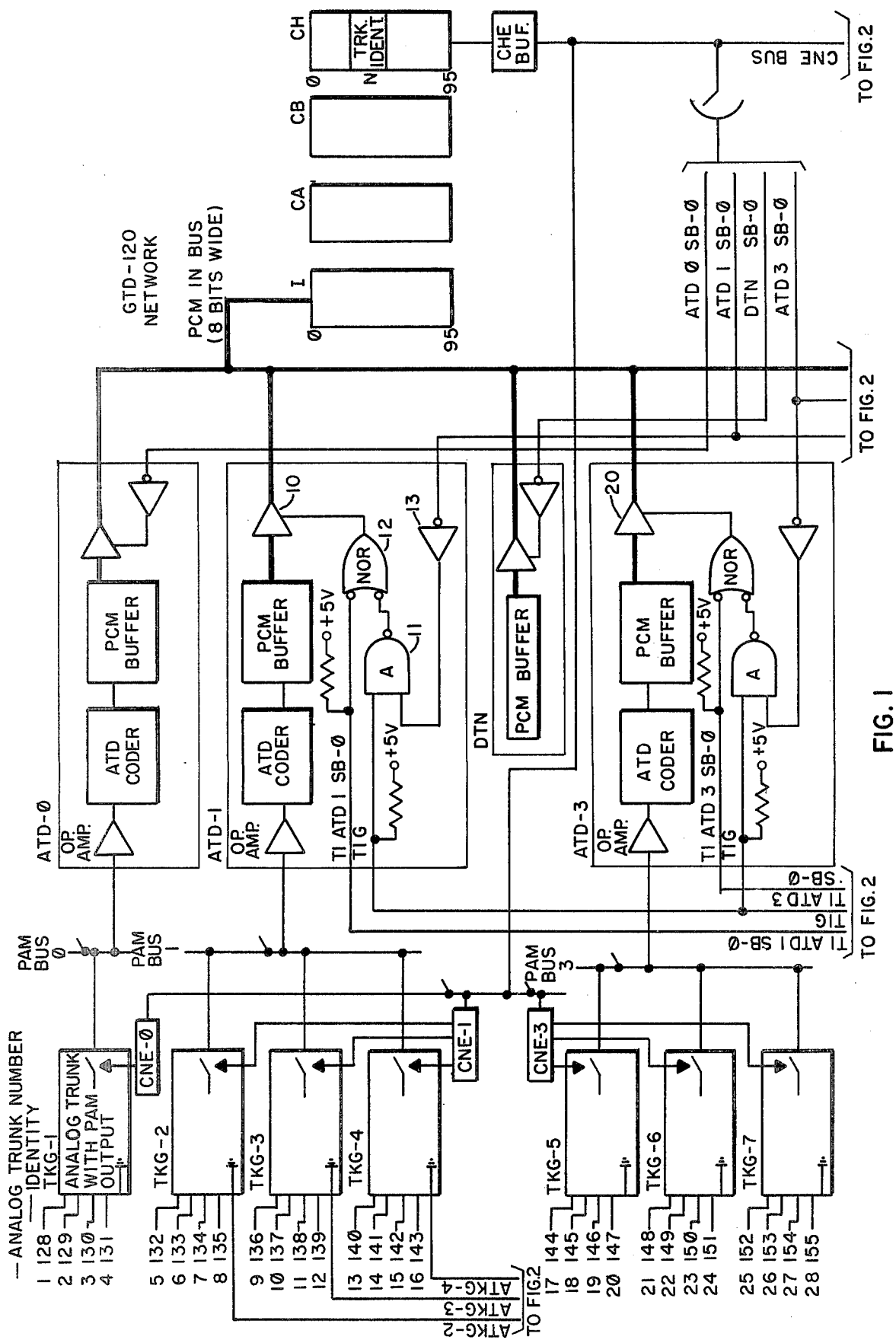
FIGS. 1 and 2 when arranged with FIG. 1 above FIG. 2 comprise a schematic block diagram of the trunk interface of an electronic pulse code modulated switching exchange embodying the principles of the present invention.

The invention uses the GTD-120 network channel enabling identity bus to detect trunk PCM time slots. The trunk identity appears on the CHE bus two channels before its PCM code should be outputted to the network PCM data bus. The identity is then stored and delayed two channels before it is used to gate its PCM data on to the PCM bus. The analog trunk PCM data will occur do to the normal GTD-120 analog to digital PAM to PCM coding process. The trunk identity is sent to a channel enabling circuit which turns on the trunks transmit gate to gate a PAM sample to the analog to digital (ATD) convertor. The ATD convertor then codes the sample to PCM code. The network, two channels after the identity was sent out, generates a strobe to the ATD convertor to gate the PCM coded data on to its PCM bus.

The GTD-120 T1 or digital trunk arrangement also has the ability to provide PCM coded data from some distant channel bank via a T1 span line. This data is enabled on to the network PCM bus by the identity being stored in the channel memory CH. This keeps the system time slot or channel number constant but requires an either or operation to control data entering the network PCM bus. It can be seen that both sources generate 24 channels of PCM code every frame regardless of how many channels are equipped. The requirement is to share these times. It is further complicated by the fact that 12 of the analog trunks are associated with an ATD convertor (ATD1) and 12 are associated with a second ATD convertor (ATD3). Thus, 24 channels must be shared but they can occur in 48 possible time slots. There are two groups of 12 channels which can each have 24 possible network time slots.

The GTD-120 analog trunks have identities 128 through 155 (total of 28) and reside on seven printed wiring cards of 4 trunks each. They are positioned such that trunk group 1 (TKG-1) has trunk identities 128 through 131. Then, trunk group 7 (TKG-7) has trunk identities 152 through 155. The digital trunk arrangement only allows for 24 trunks so TKG-1 is assigned to analog trunks only and its identities have only a single source of PCM. TKG-2, 3 and 4 are wired to ATD convertor ATD 1 and TKG-5, 6 and 7 are wired to ATD convertor ATD3. Analog identities 132 through 155 then correspond to digital trunks 1 through 24. It follows that digital trunks 1 through 12 must have the time slots of ATD convertor 1 and digital trunks 13 through 24 must have the time slots of ATD convertor 3. The controlling of the two PCM data sources in both ATD convertors 1 and 3 time slots is the heart of the invention.

The mixing of the digital analog trunks that can be provided is as listed in the following table:

| Option | Mix | T1B | TKG 2 | TKG 3 | TKG 4 | TKG 5 | TKG 6 | TKG 7 |
|---|---|---|---|---|---|---|---|---|
| 1 | 24 Analog | | x | x | x | x | x | x |
| 2 | 12A : 12D | x | x | x | x | | | |
| 3 | 8A : 16D | x | x | x | | | | |
| 4 | 4A : 20D | x | x | | | | | |
| 5 | 24 Digital | x | | | | | | |

The detection of the trunk identities occurs in the invention by monitoring the CHE bus for identities 132–135. These identities are stored and delayed two channels in the shift register. The determination of the nature of the trunk (analog or digital) is based on two factors. First, the presence of the T1B means that digital trunks are present. Also the T1B enables the ATD convertors of group 1 and 3 to use the controlled data strobe pulses from the T1B instead of the normal data strobe pulses from the network. The second factor, is the sensing of the presence of TKG-2, TKG-3 and TKG-4 when its associated identity occurs. If the analog trunk is present, the digital trunk PCM data is not allowed to be outputted to the PCM bus and the ATD convertor will receive a strobe to allow it access to the bus. The presence of each trunk is indicated by that card providing a ground potential level on a lead to the T1B circuit. If no ground is received the card is missing and the digital trunk is assumed.

Figure 2:
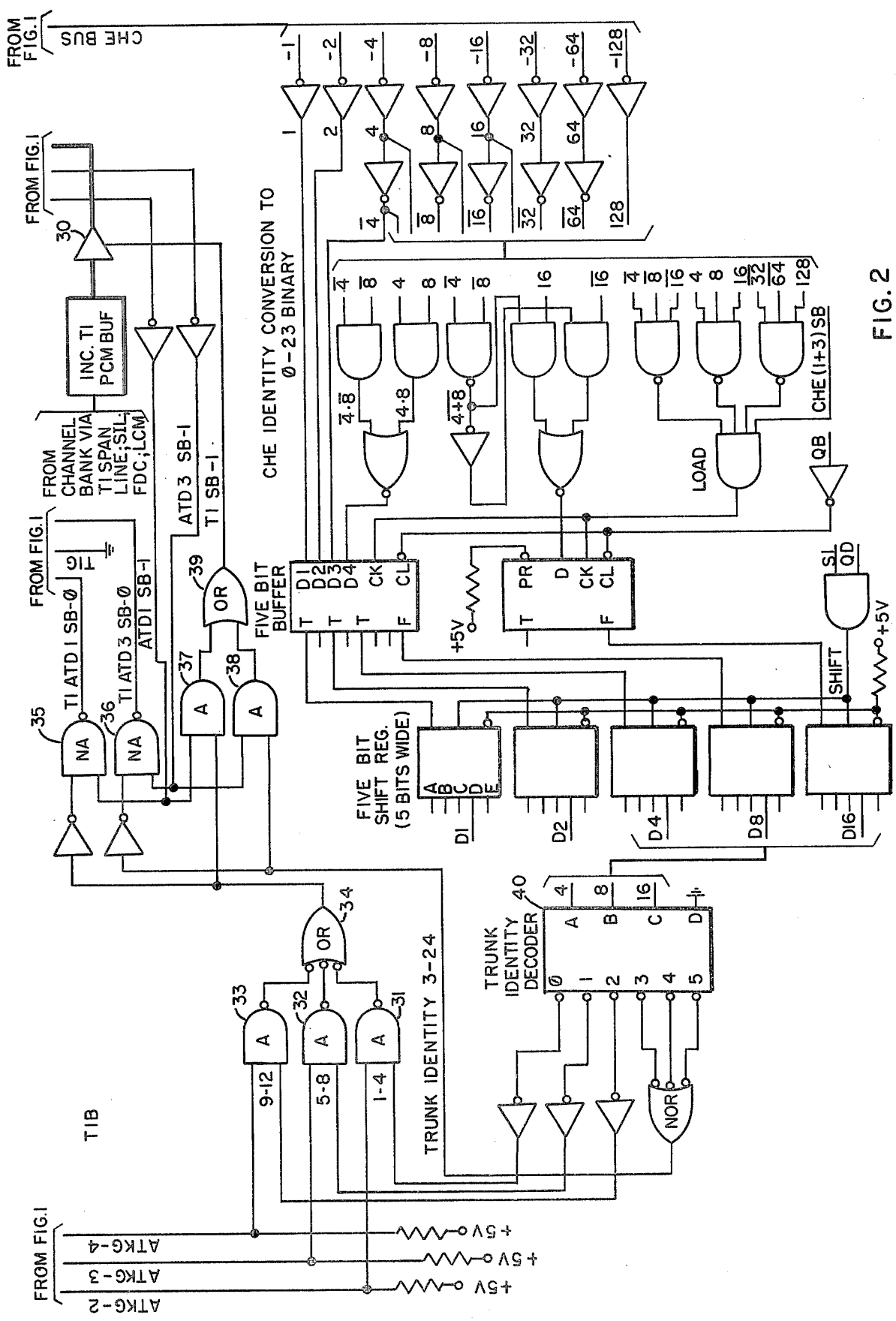

With FIG. 1 placed above FIG. 2, the GTD-120 network is on the right with the PCM IN BUS feeding time multiplexed PCM data (96 time slots per frame): (125 Msec) into the Information Memory (I). The channel Memory (CH) contains identities of devices which have been assigned time slots. Location N may have a trunk identity in it which then allows that trunk to input PCM code to the memory I time slot N of every frame via the multiplexed PCM IN BUS. The identity is buffered and sent to the channel enable circuits (CHE0, CHE1, or CHE3) for decoding. The associated channel enabling circuit CHE with that trunk identity assigned to it will then enable that trunk's transmit gate to let its PAM sample out onto the PAM Bus. The three CHE circuits are shown next to the group of their associated trunk circuits. Trunk group 1 TKG-1 is at the top left with its associated channel enable circuit CHE-0 below it and the analog to digital convertor ATD0 to its right. Trunk groups TKG-2 through 4 are below trunk group TKG-1 with CHE 1 and ATD 1. Then the digital tone card (DTN) is below ATD1. Finally, trunk groups TKG-5 through 7 follow with CHE-3 above and ATD-3 to the right. On the bottom is the T1 buffer circuit (T1B).

Each trunk circuit group has four analog trunks and four fixed identities. These are listed to the left of each trunk circuit. The concept to be here disclosed concerns the analog to digital circuits ATD 1 and 3 and not ATD0 or the DTN since these latter two circuits cannot have the T1 buffer use their time slots. In other words, the T1B will only use the time slots assigned to the ATD 1 and ATD 3 convertors. The logic which allows control of this function is shown in detail in each of the circuits ATD1 and ATD3. Only the logic important to the invention is shown for the T1 buffer-control circuit T1B.

With reference to the logic of ATD1, the gate 10 requires a true or high signal to allow the PCM data to pass through it. The two gates 11 and 12 provide an "AND" followed by an "NOR" function such that the condition to turn on the gate 10 is:

1. the absence of the T1B circuit indicated by the lack of ground G1 and shown as input T1G and the presence of the ATD1 SB-1 strobe signal from the common control complex of the network, or
2. the signal T1 ATD1 SB-0 created by the circuit of T1B.

The result is that if the signal T1G is low, the signal ATD1 SB is blocked, at AND gate 11, from reaching OR gate 12. This condition occurs if the T1 buffer and control circuit T1B is present since this lead is then grounded. If the circuit T1B is not present the lead goes high and the signal passes through the gate 11 to subsequently enable the passage of the PCM signal from the associated buffer of the analog trunk via gate 10.

Analog to digital circuit ATD3 operates in a similiar manner except that it responds to the signal ATD3 SB instead of ATD1 SB.

With reference to the logic of the T1 buffer and control circuit T1B the CHE bus identity is converted from the trunk identity numbers 132–155 to 0 to 23 respectively, by the well known logic is shown on FIG. 2. This results in a 5 bit data word which is then stored in a buffer and then shifted in a shift register four times. The result is that each identity is saved and delayed two channel's since the identity is outputted from the channel memory CH two channels before the PCM data must go into the information memory I. A decoder 40 then decodes the three highest bits to get six trunk group identities. These correspond to the trunk groups TKG-2 through TKG-7. The decode of TKG-5 through TKG-7 are further "ORed" to create the signal "Trunk Identity 13-24". Any of these identity's being decoded means the ATD3SB must be blocked and a T1 strobe created (T1SB-1) to allow this buffer circuit to present its PCM data via its gate 30 onto the PCM IN BUS. This is because all 12 of the trunks associated with ATD3 must be digital if the T1B is present in the GTD-120 system. It uses the space of the analog trunks of group 3 since the digital trunk option cards physically displace the trunk cards TKG-5 through TKG-7.

The signal then allows signal ATD3 SB-1 to be "or"ed to become T1SB-1 and disables the same signal from becoming T1 ATD 3SB-0. The result is that the T1B's gate 30 goes on and the ATD 3's gate 20 goes off every-time the decoded trunk identity of 13-24 occurs.

The decode 1–4 however, is "Anded" by the And gate 31 with signal ATKG-2. Likewise, decode 5–8 is "Anded" with signal ATKG-3 at And gate 32 and decode 9–12 is "Anded" with signal ATKG-4 at And gate 33. Only one identity can occur at one time so the outputs are "or" ed at gate 34. If analog trunk card TKG-2 is present signal ATKG-2 will be low and the decode 1–4 will be blocked. Likewise, the presence of TKG-3 forces ATKG-3 low and blocks the decode 5–8 and the presence of TKG-4 forces ATKG-4 low and blocks the decode 9–12. This, then, determines whether each identity is an analog or digital trunk with the assumption that an analog trunk being present overrides the digital. The output of the gate 34 will then allow the signal ATD1SB-1 to be gated at And gate 37 into the T1SB-1 signal via Or gate 39 if high or gated into the T1 ATD1SB-0 signal at gate 35 if low.

What is claimed is:

1. In a pulse code modulated time division communication system having: a plurality of analog terminals, a plurality of analog to digital convertors, a central control and timing means for controlling the assignment of said plurality of analog terminals to said analog to digital convertors and a common bus, each of said convertors including a buffer store having an output to said common bus for connection to an information memory for subsequent switching to an outgoing time channel; a plurality of digital channels and an arrangement for connecting said digital channels in place of certain of said analog terminals, each said digital channel also includes a buffer store having an output connection to said common bus, and comprising a plurality of first gating means each connected between said output of each said convertors buffer store and said common bus, a plurality of second gating means connected between said outputs of each said digital channels buffer store and said common bus, and a digital trunk control connected to each said gating means operated to block said first gating means during the time assigned said particular replaced analog terminal and enabling said second gating means of said corresponding digital channel.

2. In a pulse code modulated system as claimed in claim 1, wherein: said central control means allots the assignment of time to a particular one of said plurality of said terminals by applying a corresponding digital identity onto a common enabling bus; an enabling decoder associated with said plurality of analog terminals thereby operated to decode a corresponding digital identity to enable a particular one of said plurality of terminals access to said analog to digital convertor; and wherein said digital trunk control also includes a corresponding enabling decoder operated upon detecting a digital identity corresponding to a replaced analog terminal to block said first gating means and enable said gating means associated with said corresponding digital channel.

3. In a pulse code modulated time division communication switching system as claimed in claim 2, wherein: said central control outputs said digital identity a number of channels before it is required for enabling said gating means associated with said corresponding digital channel and said converter further includes a multistage shift register operatively connected between said digital trunk control and said enabling digital decoder to delay said gating to correspond to the proper channel time.

4. In a pulse code modulated time division communication switching system as claimed in claim 3, wherein: said buffer store is connected to said shift register output for control of its readout.

5. In a pulse code modulated time division communication switching system as claimed in claim 4, wherein: said shift register is connected to and operated by said timing means to shift its stored digital identity.

* * * * *